(12) United States Patent
Lu (10) Patent No.: US 10,531,345 B2
(45) Date of Patent: Jan. 7, 2020

(54) METHOD AND DEVICE FOR SHARING USER EQUIPMENT CONTEXT

(71) Applicant: BAICELLS TECHNOLOGIES CO. LTD., Beijing (CN)

(72) Inventor: Yang Lu, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 0 days.

(21) Appl. No.: 16/085,733

(22) PCT Filed: Mar. 17, 2017

(86) PCT No.: PCT/CN2017/077110
§ 371 (c)(1),
(2) Date: Sep. 17, 2018

(87) PCT Pub. No.: WO2017/157331
PCT Pub. Date: Sep. 21, 2017

(65) Prior Publication Data
US 2019/0090166 A1    Mar. 21, 2019

(30) Foreign Application Priority Data
Mar. 18, 2016  (CN) .......................... 2016 1 0159282

(51) Int. Cl.
*H04W 36/00* (2009.01)
*H04W 12/00* (2009.01)
(Continued)

(52) U.S. Cl.
CPC ....... *H04W 36/0033* (2013.01); *H04L 67/306* (2013.01); *H04W 8/24* (2013.01);
(Continued)

(58) Field of Classification Search
CPC .......... H04L 67/306; H04W 12/00403; H04W 12/0052; H04W 12/06; H04W 36/0033;
(Continued)

(56) References Cited

U.S. PATENT DOCUMENTS

2010/0260123 A1    10/2010  Sugimoto et al.
2011/0090857 A1*    4/2011  Guo .................. H04W 8/06
                                                         370/329
(Continued)

FOREIGN PATENT DOCUMENTS

CN    101610504 A    12/2009
CN    101836416 A     9/2010
(Continued)

OTHER PUBLICATIONS

International Search Report and Written Opinion for International Application No. PCT/CN2017/077110, dated Jun. 22, 2017 (Jun. 22, 2017)—12 pages; English Translation of Written Opinion—5 pages.

*Primary Examiner* — Robert J Lopata
(74) *Attorney, Agent, or Firm* — Culhane Meadows PLLC; Stephen J. Weed (57) ABSTRACT

A method and device for sharing a user equipment context are provided. The method for sharing a user equipment context includes: acquiring a global unique temporary identity (GUTI) of the UE in a network to which the UE is registered; in the case that a public land mobile network identity (PLMN-ID) in the GUTI is a neutral host access indicator (NHAMI) representing a unique network identity shared by a global Multefire neutral host (NH) network, determining that the network to which the UE is registered is a NH network, and acquiring a NH network identity (NHN-ID) of the NH network to which the UE is registered; and acquiring, based on the NHN-ID and the GUTI, context
(Continued)

information of the UE in the network to which the UE is registered.

16 Claims, 6 Drawing Sheets

(51) Int. Cl.
  *H04W 76/11* (2018.01)
  *H04L 29/08* (2006.01)
  *H04W 8/24* (2009.01)
  *H04W 12/06* (2009.01)
  *H04W 48/14* (2009.01)
  *H04W 60/00* (2009.01)
  *H04W 36/14* (2009.01)
  *H04W 8/26* (2009.01)
  *H04W 8/08* (2009.01)
  *H04W 84/04* (2009.01)

(52) U.S. Cl.
  CPC . *H04W 12/0052* (2019.01); *H04W 12/00403* (2019.01); *H04W 12/06* (2013.01); *H04W 36/0038* (2013.01); *H04W 48/14* (2013.01); *H04W 76/11* (2018.02); *H04W 8/08* (2013.01); *H04W 8/26* (2013.01); *H04W 36/14* (2013.01); *H04W 60/00* (2013.01); *H04W 84/042* (2013.01)

(58) Field of Classification Search
  CPC . H04W 36/0038; H04W 36/14; H04W 48/14; H04W 60/00; H04W 76/11; H04W 84/042; H04W 8/08; H04W 8/24; H04W 8/26
  USPC .......................................................... 370/329
  See application file for complete search history.

(56) References Cited

U.S. PATENT DOCUMENTS

| | | |
|---|---|---|
| 2016/0253388 A1 | 9/2016 | Chang et al. |
| 2016/0286600 A1* | 9/2016 | Faccin .................. H04W 12/06 |
| 2017/0111754 A1* | 4/2017 | Baghel .................... H04W 4/70 |
| 2017/0188280 A1* | 6/2017 | Watfa ..................... H04W 36/12 |
| 2017/0238278 A1* | 8/2017 | Yadav ............... H04W 28/0289 370/329 |
| 2017/0257801 A1* | 9/2017 | Toth .................. H04W 36/0033 |
| 2019/0029066 A1* | 1/2019 | Xu ......................... H04W 76/19 |
| 2019/0261227 A1* | 8/2019 | Guo ........................ H04W 8/06 |

FOREIGN PATENT DOCUMENTS

| | | |
|---|---|---|
| CN | 104639583 A | 5/2015 |
| WO | 2015014560 A1 | 2/2015 |

\* cited by examiner

METHOD AND DEVICE FOR SHARING USER EQUIPMENT CONTEXT

CROSS REFERENCE OF RELATED APPLICATION

The present application is the U.S. national phase of PCT Application PCT/CN2017/077110 filed on Mar. 17, 2017, which claims the priority of Chinese patent application No. 201610159282.9 filed on Mar. 18, 2016, the disclosure of which is incorporated herein by reference.

TECHNICAL FIELD

The present disclosure relates to the field of communications technologies, and in particular to a method and device for sharing a user equipment context.

BACKGROUND

MulteFire is a new Long Term Evolution (LTE)-based radio access technology that can operate independently in an unlicensed spectrum without the licensed frequency band carrier. MulteFire extends the LTE to the unlicensed spectrum, and the physical layer uses a Listening Before Talk (LBT) mechanism similar to the carrier sensing technology in WiFi, so as to compete fairly with the unlicensed frequency band devices for air interface resources.

MulteFire may be used in the 3GPP network architecture in the related art to interface with the 3GPP core network in the related art, and provides the capacity, coverage and data offloading of the unlicensed spectrum for the traditional mobile network operator, so as to improve the service quality of traditional operators by the supplement of the licensed spectrum or hotspot.

At the same time, MulteFire also introduced a new network architecture, providing a unified planning and self-organizing Neutral Host (NH) network, and the service providers, equipment suppliers or users all can participate in network deployment, the network can serve a variety of service providers including Internet service providers, cable TV, mobile network operators, enterprise and public place service providers, and can provide an authentication and a network access to terminals without SIM cards.

At present, the alliance organization that promotes MulteFire has been established and operated, so as to promote the development of MulteFire's global technology specifications, promote the future evolution of MulteFire and to ensure that MulteFire devices and other devices in the unlicensed spectrum (e.g., WiFi) may compete fairly for unlicensed spectrum resources.

Specifically, in the NH network mode of MulteFire (referred to as MF), the MF access point (AP) is connected to the NH core network (CN), and the NH CN is similar to the 3GPP LTE core network and includes an NH Mobility Management Element (MME), an NH Gateway (GW) and an NH Authentication, Authorization and Accounting (AAA) server.

In the NH network mode of MulteFire, a Service Provider Identity (PSP-ID) is introduced to support various service providers. The concept of the NH network and the service provider network is independent from each other. There are three new network identities, namely the NH network identity (NHN-ID), the PSP-ID and a unique network identity shared by the global MulteFire NH network. The NHN-ID is an NH network operator identity, similar to the SSID of the WLAN network. The NHN-ID can be freely configured by the NH network or uniformly distributed by the operation and maintenance center. The NH core network allocates a unique Globally Unique Temporary Identity (GUTI) to the user equipment (UE) in the NH network, that is, the GUTI is uniquely allocated in the NHN-ID. Each MME may support multiple NH networks, and the MME of each NH network has a unique MME identity in the NHN-ID, and the MME may be uniquely determined based on the NHN-ID and the MME identity.

The neutral host access indicator (NHAMI), which represents the unique network identity shared by the global Multefire NH network, is an NH mode MF network-dedicated public land mobile network identity (PLMN-ID) reserved from the PLMN-ID used by the 3GPP, but the NHAMI has no actual meaning but only to be compatible with the related technologies and replace the PLMN-ID field in the S1 message or the NAS message in the signaling process in the related art with NHAMI. The PSP-ID is the service provider identity, and the network determines the AAA server of the UE through the PSP-ID.

In the LTE technology in the related art, the network operator and the service provider are the same, that is, the network operator ID of the serving UE is the same as the service provider ID, and they are mobile network operators identified by the PLMN-ID. When the UE moves in the network, the UE may initiate a tracking area update (TAU) process to change the location area where the UE is registered in the CN, or initiate a GUTI-based attach procedure to re-register in the current serving network, and the UE carries the GUTI of the UE in the network to which the UE is registered in the TAU request message or the GUTI-based attach request message. The GUTI includes the PLMN-ID and the MME identity that the UE has registered. After receiving the TAU request message or the attach request message of the UE, the MME may acquire context information of the UE in the registered network according to the GUTI. In the case that the context information of the UE is successfully acquired by the MME, the MME does not need to re-authenticate the UE and register the UE to the network again, or does not need to re-authenticate the UE when processing the attach request message, while the MME needs to re-authenticate the UE in the case that the MME does not successfully acquire the context information of the UE.

However, in the NH network, the PLMN-ID in the GUTI is the NHAMI, and the NHAMI is the globally unique network identity shared by all the NH mode ME networks. That is, in the NH network, the MME that the UE has registered cannot be uniquely determined only based on the GUTI. Therefore, it is impossible to acquire context information of the UE in the registered NH network only based on the GUTI.

SUMMARY

An object of the present disclosure is to provide a method and device for sharing a user equipment context, so as to solve the technical issue that that the context information of the UE in the NH network to which the UE is registered cannot be acquired based on the GUTI in the related art.

To achieve the above object, a method for sharing a UE context is provided in the present disclosure, which is applied to a second MME and includes:

acquiring a GUTI of the UE in a network to which the UE is registered;

in the case that a PLMN-ID in the GUTI is an NHAMI representing a unique network identity shared by a global Multefire NH network, determining that the network to which the UE is registered is an NH network, and acquiring an NHN-ID of the NH network to which the UE is registered; and acquiring, based on the NHN-ID and the GUTI, context information of the UE in the network to which the UE is registered.

A device for sharing a UE context is further provided in the present disclosure, which is applied to a second MME and includes:

a first acquiring module, configured to acquire a GUTI of the UE in a network to which the UE is registered;

a second acquiring module, configured to, in the case that a PLMN-ID in the GUTI is an NHAMI representing a unique network identity shared by a global Multefire NH network, determine that the network to which the UE is registered is an NH network, and acquire an NHN-ID of the NH network to which the UE is registered; and a third acquiring module, configured to acquire, based on the NHN-ID and the GUTI, context information of the UE in the network to which the UE is registered.

On the other hand, a method for sharing a UE context is further provided in the present disclosure, which is applied to a first MME and includes:

receiving a UE context request message sent by a second MME and carrying a GUTI of a UE in a network to which the UE is registered and an NHN-ID;

sending, based on the UE context request message, context information of the UE to the second MME.

On the other hand, a method for sharing a UE context is further provided in the present disclosure, which is applied to a first MME and includes:

a receiving module, configured to receive a UE context request message sent by a second MME and carrying a GUTI of a UE in a network to which the UE is registered and an NHN-ID;

a sending module, configured to send, based on the UE context request message, context information of the UE to the second MME.

On the other hand, a method for sharing a UE context is further provided in the present disclosure, which is applied to a UE and includes:

in the case that a registered network is a Multefire NH network, sending a GUTI of the registered network and an NHN-ID of the registered network to a second MME, to enable the second MME to acquire context information of the UE based on the GUTI and the NHN-ID, where a PLMN-ID in the GUTI is an NHAMI representing a unique network identity shared by a global Multefire NH network.

On the other hand, a chip for sharing a UE context is further provided in the present disclosure, which is applied to a second MME and includes: a processor and a memory storing a program to be executed by the processor, when the program is executed, the processor is configured to:

acquire a GUTI of the UE in a network to which the UE is registered;

in the case that a PLMN-ID in the GUTI is an NHAMI representing a unique network identity shared by a global Multefire NH network, determine that the network to which the UE is registered is an NH network, and acquire an NHN-ID of the NH network to which the UE is registered; and acquire, based on the NHN-ID and the GUTI, context information of the UE in the network to which the UE is registered.

On the other hand, a chip for sharing a UE context, applied to a first MME and including a processor and a memory storing a program to be executed by the processor, when the program is executed, the processor is configured to:

receive a UE context request message sent by a second MME and carrying a GUTI of a UE in a network to which the UE is registered and an NHN-ID;

send, based on the UE context request message, context information of the UE to the second MME.

According to the above technical solutions of the present disclosure, by acquiring the GUTI of the UE in the network to which the UE is registered, in the case that the PLMN-ID in the GUTI is the NHAMI representing the unique network identity shared by the global Multefire NH network, it is determined that the network to which the UE is registered is the NH network. Acquiring the NHN-ID of the NH to which the UE is registered, and acquiring context information of the UE in the registered network based on the NHN-ID and the GUTI, so that even if the network to which the UE is registered is the NH network, the context information of the UE in the registered network can also be acquired, thereby avoiding the re-authentication for the UE, reducing the network signaling burden and improving the network performance.

DETAILED DESCRIPTION

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the NH network in the related art, the context information of the UE in the NH network to which the UE is registered cannot be obtained only based on the GUTI, so the UE needs to re-authenticated and registered to the network again when the UE initiates the TAU procedure, or the UE needs to be re-authenticated when the UE initiates the attachment procedure. In view of this, a method and device for sharing a UE context are provided in the present disclosure, a GUTI of the UE in network to which the UE is registered is acquired, in the case that a PLMN-ID in the GUTI is an NHAMI representing a unique network identity shared by a global Multefire NH network, it is determined that the network to which the UE is registered is an NH network, and an NHN-ID of the NH network to which the UE is registered is acquired, and context information of the UE in the network to which the UE is registered is acquired based on the NHN-ID and the GUTI. As such, it is able to acquire the context information of the UE in the network to which the UE is registered even if the network to which the UE is registered is an NH network.

Figure 1:
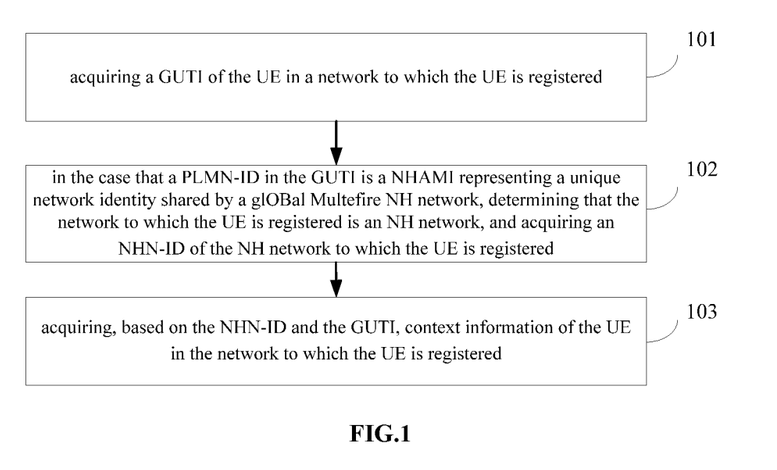
FIG. 1 is a flowchart of a method for sharing a UE context in some embodiments of the present disclosure.

As shown in FIG. 1, a method for sharing a UE context is provided in some embodiments of the present disclosure, applied to a second MME, where the second MME is an MME to which a UE is currently to be registered. The method includes the following steps 101 to 103, which are described in detail below.

Step 101: acquiring a global unique temporary identity (GUTI) of the UE in a network to which the UE is registered;

In some embodiments of the present disclosure, the UE may be a mobile phone terminal, or other devices capable of transmitting or receiving radio signals, such as a personal digital assistant (PDA), a wireless modem, a wireless communication device, a handheld device, a desktop computer, a cordless telephone, a wireless local loop (WLL) station, a CPE or MiFi capable of converting a mobile signal into a WiFi signal, a smart home appliance, or other device capable of spontaneously communicating with a mobile communication network without any human intervention.

Specifically, the GUTI is a globally unique temporary identity allocated by the core network CN to the UE in the NH network or the 3GPP network, and the GUTI includes the public land mobile network identity (PLMN-ID), the identity of the MME to which the UE is registered, and the temporary identity S-TMSI in the identity of the MME to which the UE is registered.

Step 102: in the case that a PLMN-ID in the GUTI is a neutral host access indicator (NHAMI) representing a unique network identity shared by a global Multefire neutral host (NH) network, determining that the network to which the UE is registered is an NH network, and acquiring an NH network identity (NHN-ID) of the NH network to which the UE is registered.

In some embodiments of the present disclosure, when the PLMN-ID in the GUTI is an NHAMI, it is indicated that the network to which the UE is currently registered is an NH network. When the PLMN-ID in the GUTI is a PLMN-ID of the 3GPP network but not an NHAMI, it is indicated that the network to which the UE is currently registered is a 3GPP network.

The NHAMI without any actual meaning is a network identity shared by the NH network, and the GUTI is allocated by the MME in the NH network, therefore, when the network to which the UE is registered is the NH network, in order to acquire the context information of the UE in the registered network, it is further required to acquire the NHN-ID of the NH network to which the UE is registered, so as to acquire the context information of the UE from the MME in the corresponding NH network. The NHN-ID is an NH network identity, which is freely configured by the NH network or uniformly allocated by the operation and maintenance center.

Step 103: acquiring, based on the NHN-ID and the GUTI, context information of the UE in the network to which the UE is registered.

The MME of the NH network to which the UE is registered may be uniquely determined based on the NHN-ID. Because the GUTI of the UE is allocated by the MME, the UE context in the MME may be uniquely determined based on the GUTI, thereby acquiring the context information of the UE in the network to which the UE is registered.

In some embodiments of the present disclosure, the method for sharing the UE context further includes:

in the case that the PLMN-ID in the GUTI is not the NHAMI representing the unique network identity shared by the global Multefire NH network, determining that the network to which the UE is registered is a 3GPP network, and acquiring, based on the GUTI, the context information of the UE in the network to which the UE is registered.

Specifically, when the PLMN-ID in the GUTI is not the NHAMI, it may be indicated that the network to which the UE is currently registered is a 3GPP network. Since the network operator and the service provider are the same in the 3GPP network, that is, the network operator ID serving the UE is the same as the service provider ID, which are both the mobile network operator identified by the PLMN-ID, so when registered network is a 3GPP network, it is able to acquire the context information of the UE in the registered 3GPP network based on the acquired GUTI.

According to the method for sharing the UE context in some embodiments of the present disclosure, by acquiring the GUTI of the UE in the network to which the UE is registered, in the case that the PLMN-ID in the GUTI is the NHAMI representing the unique network identity shared by the global Multefire NH network, it is determined that the network to which the UE is registered is the NH network. The NHN-ID of the NH to which the UE is registered is acquired, and the context information of the UE in the registered network is acquired based on the NHN-ID and the GUTI, so that even if the network to which the UE is registered is the NH network, the context information of the UE in the registered network can also be acquired, thereby avoiding the re-authentication for the UE, reducing the network signaling burden and improving the network performance.

Figure 2:
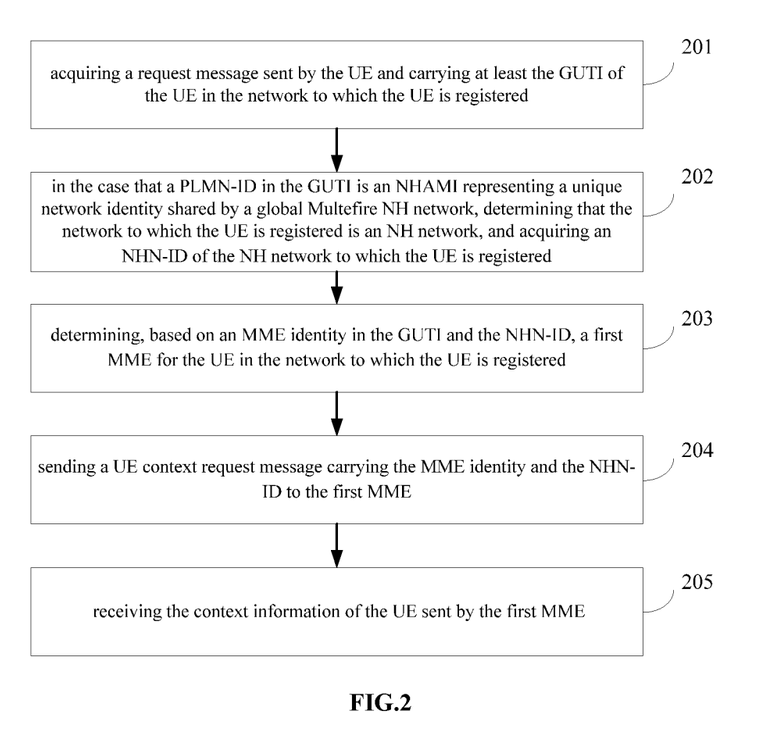
FIG. 2 is a flowchart of a method for sharing a UE context in some embodiments of the present disclosure.

As shown in FIG. 2, a method for sharing a UE context is further provided in some embodiments of the present disclosure, which is applied to a second MME and includes the following steps 201 to 205, which are described in detail below.

Step 201: acquiring a request message sent by the UE and carrying at least the GUTI of the UE in the network to which the UE is registered.

The request message acquired in step 201 is a tracking area update (TAU) request message, a service request (SR) message, or an attach request message. Specifically, according to the TAU request message sent by the UE, the location area where the UE is registered in the CN may be changed based on the TAU request message sent by the UE, and the connection relationship between the UE and the CN may be re-established based on the SR message sent by the UE, and the UE may be re-registered in the current service network based on the GUTI-based attach request message sent by the UE.

Since the request message acquired by the second MME carries the GUTI of the UE in the network to which the UE is registered, it is able to acquire the GUTI of the UE in the network to which the UE is registered.

Step 202: in the case that a PLMN-ID in the GUTI is an NHAMI representing a unique network identity shared by a global Multefire NH network, determining that the network to which the UE is registered is an NH network, and acquiring an NHN-ID of the NH network to which the UE is registered.

In some embodiments of the present disclosure, in the case that the PLMN-ID in the GUTI is NHAMI, it is indicated that the network to which the UE is currently registered is an NH network, while in the case that the PLMN-ID in the GUTI is a PLMN-ID of the 3GPP network but not an NHAMI, it is indicated that the network to which the UE is currently registered is a 3GPP network.

The NHAMI without any actual meaning is a network identity shared by the NH network, and the GUTI is allocated uniquely in the NHN-ID, therefore, when the network to which the UE is registered is the NH network, in order to acquire the context information of the UE in the registered network, it is further required to acquire the NHN-ID of the NH network to which the UE is registered. The NHN-ID is an NH network identity, which is freely configured by the NH network or uniformly allocated by the operation and maintenance center.

Step 203: determining, based on an MME identity in the GUTI and the NHN-ID, a first MME for the UE in the network to which the UE is registered.

Specifically, the first MME is an MME to which the UE is registered. Since the NH CN allocates a unique GUTI to the UE in the NH network, that is, the GUTI is allocated by the NHN network MME, each MME can support multiple NH networks, and the MME of each NH network has a unique in the NHN-ID. Therefore, the MME can be uniquely determined based on the NHN-ID and the MME identity. That is, after acquiring the MME identity and the NHN-ID of the UE in the registered network, the MME of the UE in the registered network may be determined.

Step 204: sending a UE context request message carrying the MME identity and the NHN-ID to the first MME.

In order to acquire the context information of the UE in the registered network, the second MME may send a UE context request message to the first MME. Specifically, the UE context request message carries the acquired MME identity and the NHN-ID, so as to correctly acquire the context information of the UE.

Step 205: receiving the context information of the UE sent by the first MME.

The context information of the UE includes a Participating Service Provider Identity (PSP-ID) authenticated by the UE, the NHN-ID and security context information of the UE.

In this way, if the UE sends a request message such as a TAU request message, an SR message, or an attach request message, after learning the context information of the UE in the registered network, the network of the serving UE can be changed to the NH network currently selected by the UE. However, the MME does not need to re-authenticate the UE, but directly performs TAU, connection establishment, or network registration for the UE, thereby reducing the network signaling and improving the network performance.

In addition, in some embodiments of the present disclosure, if the PLMN-ID in the GUTI is not the NHAMI but the 3GPP network PLMN-ID, it may be determined that the network to which the UE is registered is a 3GPP network, and the context information of the UE in the network to which the UE is registered may be acquired based on the GUTI.

In the case that the network to which the UE is registered is a 3GPP network, the acquiring, based on the GUTI, the context information of the UE in the network to which the UE is registered includes: determining, based on an MME identity in the GUTI, a first MME for the UE in the network to which the UE is registered; sending, by a second MME, a UE context request message carrying the MME identity to the first MME; and receiving the context information of the UE sent by the first MME, where the context information of the UE includes a PSP-ID authenticated by the UE and security context information of the UE.

According to the method for sharing the UE context in some embodiments of the present disclosure, the request message sent by the UE and carrying at least the GUTI of the UE in the network to which the UE is registered is acquired, in the case that the PLMN-ID in the GUTI is the NHAMI representing the unique network identity shared by the global Multefire NH network, it is determined that the network to which the UE is registered is the NH network. The NHN-ID of the NH network to which the UE is registered is acquired. A first MME for the UE in the network to which the UE is registered is determined based on an MME identity in the GUTI and the NHN-ID. A UE context request message carrying the MME identity and the NHN-ID is sent to the first MME. The context information of the UE sent by the first MME is received, so that even if the network to which the UE is registered is the NH network, the context information of the UE in the registered network can also be acquired, thereby avoiding the re-authentication for the UE, reducing the network signaling burden and improving the network performance.

Figure 3:
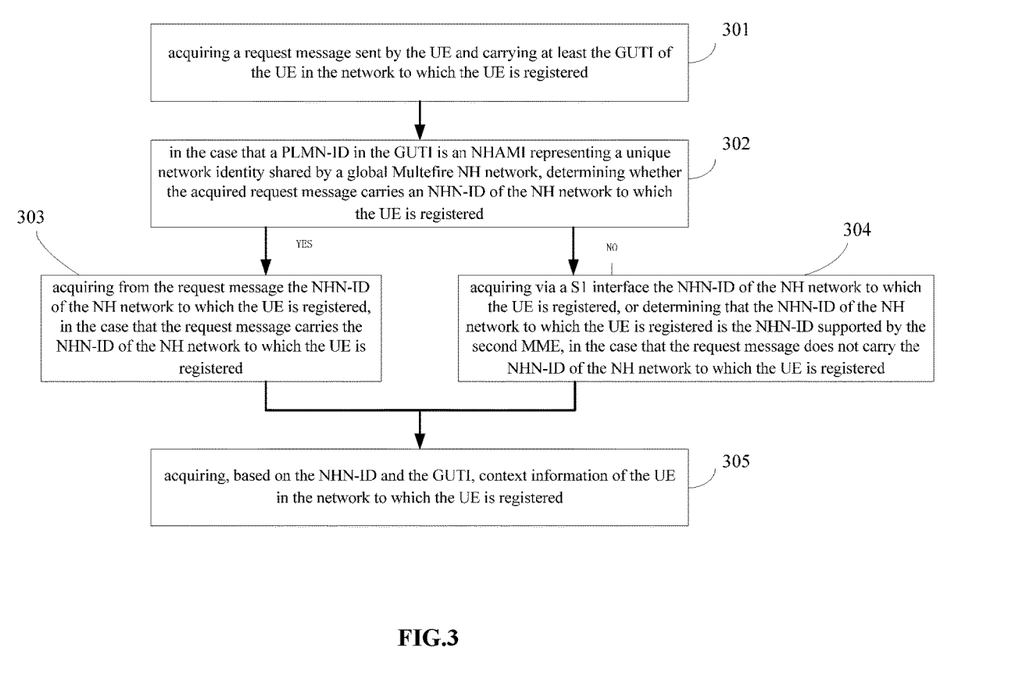
FIG. 3 is a flowchart of a method for sharing a UE context in some embodiments of the present disclosure.

As shown in FIG. 3, a method for sharing a UE context is provided in some embodiments of the present disclosure, applied to a second MME and includes the following steps 301 to 305, which are described in detail below.

Step 301: acquiring a request message sent by the UE and carrying at least the GUTI of the UE in the network to which the UE is registered.

The request message acquired in step 301 is a tracking area update (TAU) request message, a service request (SR) message, or an attach request message. Specifically, according to the TAU request message sent by the UE, the location area where the UE is registered in the CN may be changed based on the TAU request message sent by the UE, and the connection relationship between the UE and the CN may be re-established based on the SR message sent by the UE, and the UE may be re-registered in the current service network based on the GUTI-based attach request message sent by the UE.

Since the request message acquired by the second MME carries the GUTI of the UE in the network to which the UE is registered, it is able to acquire the GUTI of the UE in the network to which the UE is registered.

Step 302: in the case that a PLMN-ID in the GUTI is an NHAMI representing a unique network identity shared by a global Multefire NH network, determining whether the acquired request message carries an NHN-ID of the NH network to which the UE is registered.

When the NHN-ID of the NH network to be selected by the UE is different from the NHN-ID of the NH network to which the UE is registered, the UE needs to add the NHN-ID of the NH network to which the UE is registered to the request message when sending the request message. When the NHN-ID of the NH network to be selected by the UE is the same as the NH network to which the UE is registered, in order to save signaling overhead, the UE may not join the NHN-ID of the NH network to which the UE is registered to the request message when sending the request message.

Step 303: acquiring from the request message the NHN-ID of the NH network to which the UE is registered, in the case that the request message carries the NHN-ID of the NH network to which the UE is registered.

Specifically, when acquiring the NHN-ID of the NH network to which the UE is registered, the NHN-ID of the NH network to which the UE is registered may be acquired from the request message in the case that the request message carries the NHN-ID of the NH network to which the UE is registered.

Step 304: acquiring via a S1 interface the NHN-ID of the NH network to which the UE is registered, or determining that the NHN-ID of the NH network to which the UE is registered is the NHN-ID supported by the second MME, in the case that the request message does not carry the NHN-ID of the NH network to which the UE is registered.

Specifically, when acquiring the NHN-ID of the NH network to which the UE is registered, in the case that the acquired request message does not carry the NHN-ID of the NH network to which the UE is registered, it is determined that the NHN-ID to be selected by the UE is the same with the registered NHN, and the second MME may learn the NHN-ID (i.e., the registered NHN-ID) of the NH network to which the UE is registered currently through the S1 interface message on the S1 interface. In addition, in the case that the second MME supports only one NHN network, when the acquired request message does not carry the NHN-ID of the NH network to which the UE is registered, the second MME determines that the NHN-ID of the NH network which the UE is to select is the same with the NHN-ID of the NH network to which the UE is registered, it may be directly determined that the registered NHN-ID of the UE is the only supported NHN-ID. The S1 interface message is a signaling message that is sent by the base station to the MME to forward the request message of the UE.

Step 305: acquiring, based on the NHN-ID and the GUTI, context information of the UE in the network to which the UE is registered.

In some embodiments of the present disclosure, when acquiring, based on the NHN-ID and the GUTI, context information of the UE in the network to which the UE is registered, the second MME may be acquired through an interaction with the first MME (i.e., the MME to which the UE has already registered). The process of acquiring the second MME is as follows: Firstly, the second MME sends a UE context request message carrying an MME identity and an NHN-ID to the first MME, and then the first MME feeds back the context information of the UE to the second MME.

Specifically, the implementation of the step 305 can be referred to the foregoing steps 203 to 205.

In this way, if the UE sends a request message such as a TAU request message, an SR message, or an attach request message, after learning the context information of the UE in the registered network, the network of the serving UE can be changed to the NH network currently selected by the UE. However, the MME does not need to re-authenticate the UE, but directly performs TAU, connection establishment, or network registration for the UE, thereby reducing the network signaling and improving the network performance.

In the following, two embodiments of the present disclosure will be described.

Figure 4:
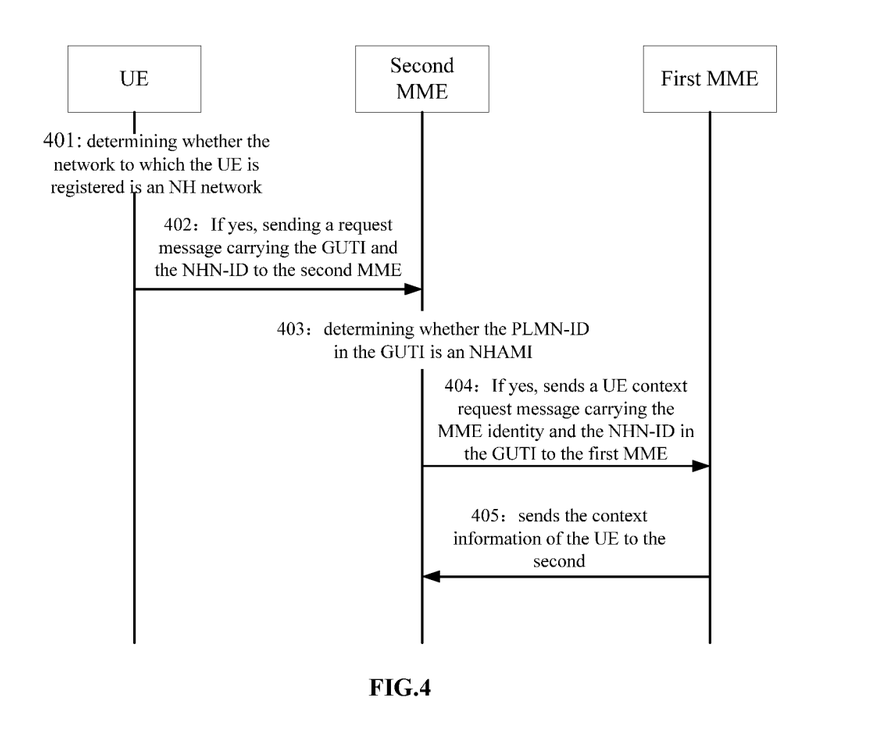
FIG. 4 is a flowchart of a method for sharing a UE context in some embodiments of the present disclosure.

FIG. 4 is a flowchart of a method for sharing a UE context in some embodiments of the present disclosure. As shown in FIG. 4, the method includes:

Step 401: the UE determines whether the network to which the UE is registered is an NH network.

Step 402: if the network to which the UE is registered is an NH network, the UE sends a request message carrying the GUTI and the NHN-ID to the second MME;

Step 403: the second MME determines whether the PLMN-ID in the GUTI is an NHAMI.

Step 404: if the PLMN-ID in the GUTI is an NHAMI, the second MME sends a UE context request message carrying the MME identity and the NHN-ID in the GUTI to the first MME;

Step 405: the first MME sends the context information of the UE to the second MME.

Figure 5:
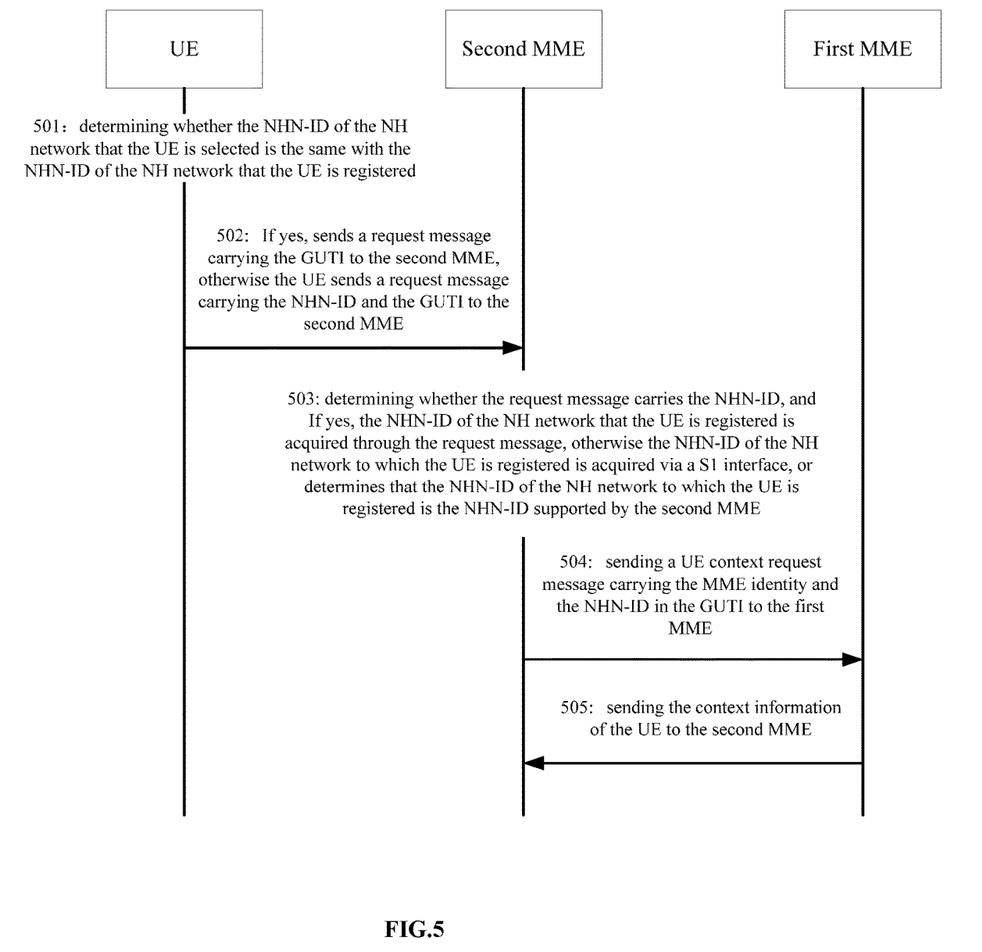
FIG. 5 is a flowchart of a method for sharing a UE context in some embodiments of the present disclosure.

FIG. 5 is a flowchart of a method for sharing a UE context in some embodiments of the present disclosure. As shown in FIG. 4, the method includes:

Step 501: in the case that the network to which the UE is registered is the NH network, the UE determines whether the NHN-ID of the NH network that the UE is selected is the same with the NHN-ID of the NH network that the UE is registered.

Step 502: in the case that the NHN-ID of the NH network that the UE is selected is the same with the NHN-ID of the NH network that the UE is registered, the UE sends a request message carrying the GUTI to the second MME, otherwise the UE sends a request message carrying the NHN-ID and the GUTI to the second MME;

Step 503: in the case that the PLMN-ID in the GUTI is the NHAMI, the second MME determines whether the request message carries the NHN-ID, and in the case that the request message carries the NHN-ID, the NHN-ID of the NH network that the UE is registered is acquired through the request message, otherwise the NHN-ID of the NH network to which the UE is registered is acquired via a S1 interface, or determines that the NHN-ID of the NH network to which the UE is registered is the NHN-ID supported by the second MME.

Step 504: the second MME sends a UE context request message carrying the MME identity and the NHN-ID in the GUTI to the first MME.

Step 505: the first MME sends the context information of the UE to the second MME.

According to the method for sharing the UE context in some embodiments of the present disclosure, the request message sent by the UE and carrying at least the GUTI of the UE in the network to which the UE is registered is acquired, in the case that the PLMN-ID in the GUTI is the NHAMI representing the unique network identity shared by the global Multefire NH network, it is determined that the network to which the UE is registered is the NH network. The NHN-ID of the NH to which the UE is registered is acquired, and the context information of the UE in the registered network is acquired based on the NHN-ID and the GUTI, so that even if the network to which the UE is registered is the NH network, the context information of the UE in the registered network can also be acquired, thereby avoiding the re-authentication for the UE, reducing the network signaling burden and improving the network performance.

Figure 6:
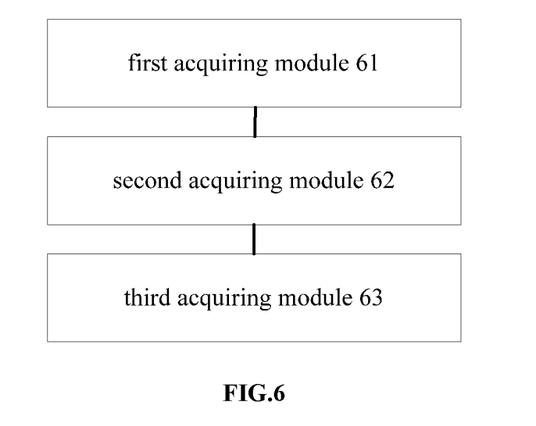
FIG. 6 is a schematic view of a device for sharing a UE context in some embodiments of the present disclosure.

As shown in FIG. 6, a device for sharing a UE context is provided in the present disclosure, which is applied to a second MME and includes:

a first acquiring module 61, configured to acquire a GUTI of the UE in a network to which the UE is registered;

a second acquiring module 62, configured to, in the case that a PLMN-ID in the GUTI is a NHAMI representing a unique network identity shared by a global Multefire NH network, determine that the network to which the UE is registered is a NH network, and acquire a NHN-ID of the NH network to which the UE is registered; and a third acquiring module 63, configured to acquire, based on the NHN-ID and the GUTI, context information of the UE in the network to which the UE is registered.

The device further includes:

a fourth acquiring module, configured to, in the case that the PLMN-ID in the GUTI is not the NHAMI representing the unique network identity shared by the global Multefire NH network, determine that the network to which the UE is registered is a 3GPP network, and acquire, based on the GUTI, the context information of the UE in the network to which the UE is registered.

Furthermore, the first acquiring module includes:

an acquiring unit, configured to acquire a NAS request message sent by the UE and carrying at least the GUTI of the UE in the network to which the UE is registered, where the request message is a TAU request message, a service request (SR) message, or an attach request message.

Furthermore, the second acquiring module is further configured to:

acquire from the request message the NHN-ID of the NH network to which the UE is registered, in the case that the request message carries the NHN-ID of the NH network to which the UE is registered.

Furthermore, the second acquiring module is further configured to:

acquire via a S1 interface the NHN-ID of the NH network to which the UE is registered, or determine that the NHN-ID of the NH network to which the UE is registered is the NHN-ID supported by the second MME, in the case that the request message does not carry the NHN-ID of the NH network to which the UE is registered.

Furthermore, the third acquiring module includes:

a determining module, configured to determine, based on an MME identity in the GUTI and the NHN-ID, a first MME for the UE in the network to which the UE is registered;

a sending module, configured to send a UE context request message carrying the MME identity and the NHN-ID to the first MME; and a receiving module, configured to receive the context information of the UE sent by the first MME, where the context information of the UE includes a PSP-ID authenticated by the UE, the NHN-ID and security context information of the UE.

The device embodiment of the present disclosure is a device corresponding to the embodiment of the foregoing method, and all the implementation means in the foregoing method embodiments are applicable to the embodiment of the device, and the same technical effect can be achieved.

Figure 7:
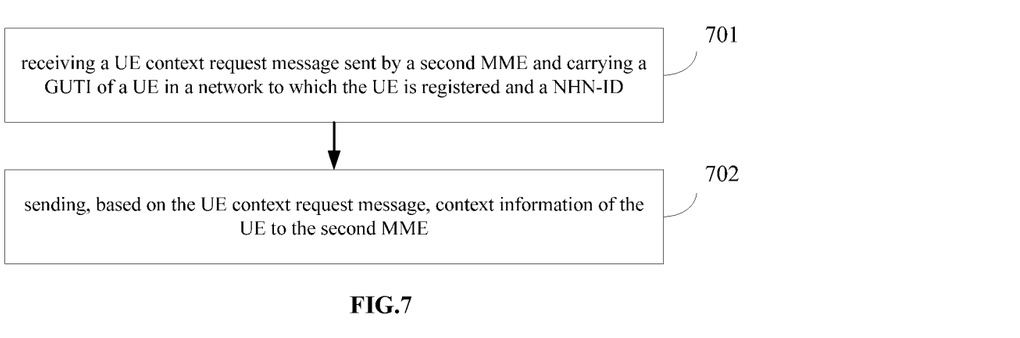
FIG. 7 is a flowchart of a method for sharing a UE context in some embodiments of the present disclosure.

As shown in FIG. 7, a method for sharing a UE context is further provided in some embodiments of the present disclosure, which is applied to a first MME and includes:

Step 701: receiving a UE context request message sent by a second MME and carrying a GUTI of a UE in a network to which the UE is registered and a NHN-ID.

In order to acquire the context information of the UE in the registered network, the second MME may send a UE context request message to the first MME. Specifically, the UE context request message carries the acquired GUTI and the NHN-ID, so as to correctly acquire the context information of the UE.

Step 702: sending, based on the UE context request message, context information of the UE to the second MME.

The context information of the UE includes a PSP-ID authenticated by the UE, the NHN-ID and security context information of the UE.

Figure 8:
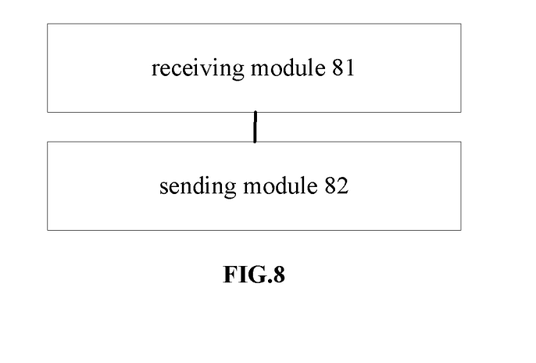
FIG. 8 is a schematic view of a device for sharing a UE context in some embodiments of the present disclosure.

As shown in FIG. 8, a device for sharing a UE context is further provided in some embodiments of the present disclosure, which is applied to a first MME and includes:

a receiving module 81, configured to receive a UE context request message sent by a second MME and carrying a GUTI of a UE in a network to which the UE is registered and a NHN-ID;

a sending module 82, configured to send, based on the UE context request message, context information of the UE to the second MME.

Figure 9:
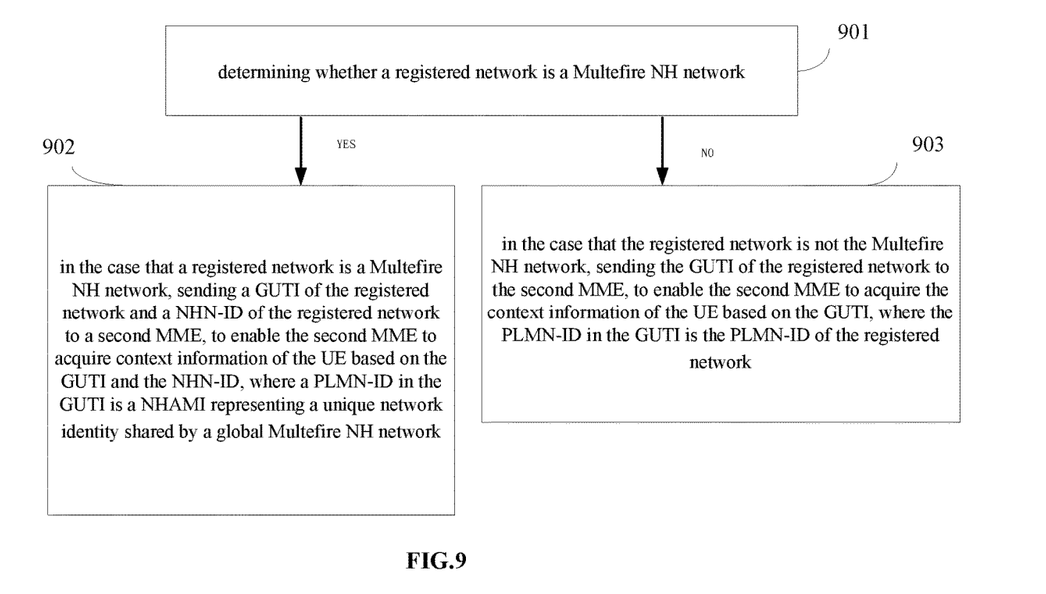
FIG. 9 is a flowchart of a method for sharing a UE context in some embodiments of the present disclosure.

As shown in FIG. 9, a method for sharing a UE context is further provided in some embodiments of the present disclosure, which is applied to a UE and includes:

Step 901: determining whether a registered network is a Multefire NH network;

Step 902: in the case that a registered network is a Multefire NH network, sending a GUTI of the registered network and a NHN-ID of the registered network to a second MME, to enable the second MME to acquire context information of the UE based on the GUTI and the NHN-ID, where a PLMN-ID in the GUTI is a NHAMI representing a unique network identity shared by a global Multefire NH network.

Step 903: in the case that the registered network is not the Multefire NH network, sending the GUTI of the registered network to the second MME, to enable the second MME to acquire the context information of the UE based on the GUTI, where the PLMN-ID in the GUTI is the PLMN-ID of the registered network.

In some embodiments of the present disclosure, the sending the GUTI of the registered network and the NHN-ID of the registered network to the second MME includes: sending, through a NAS request message, the GUTI of the registered network and the NHN-ID of the registered network to the second MME, where the request message is a TAU request message, a SR message, or an attach request message.

In some embodiments of the present disclosure, the sending the GUTI of the registered network and the NHN-ID of the registered network to the second MME includes: determining whether a currently selected NH network is the registered NH network; sending the GUTI of the registered network to the second MME in the case that the currently selected NH network is the registered NH network, or sending the GUTI of the registered network and the NHN-ID of the registered network to the second MME in the case that the currently selected NH network is not the registered NH network.

The basic principles of the present disclosure have been described above in connection with the specific embodiments, but it should be noted that those skilled in the art can understand that all or any of the steps or components of the methods and apparatus of the present disclosure may be in any computing device. (including a processor, a storage medium, etc.) or a network of computing devices implemented in hardware, firmware, software, or a combination thereof, which is used by those of ordinary skill in the art in view of the teachings of the disclosure. Programming skills can be achieved.

Thus, the objects of the present disclosure can also be achieved by running a program or a set of programs on any computing device. The computing device can be a well-known general purpose device. Accordingly, the objects of the present disclosure may also be realized by merely providing a program product including program code for implementing the method or apparatus. That is to say, such a program product also constitutes the present disclosure, and a storage medium storing such a program product also constitutes the present disclosure. It will be apparent that the storage medium may be any known storage medium or any storage medium developed in the future. It should also be noted that in the apparatus and method of the present disclosure, it is apparent that various components or steps may be decomposed and/or recombined. These decompositions and/or recombinations should be considered as equivalents to the present disclosure. Also, the steps of performing the above-described series of processing may naturally be performed in chronological order in the order illustrated, but need not necessarily be performed in chronological order. Certain steps may be performed in parallel 10 or independently of each other.

The present disclosure is described with reference to flowchart illustrations and/or block diagrams of methods, apparatus (system), and computer program products according to some embodiments of the present disclosure. It will be understood that each flow and/or block of the flowchart illustrations and/or FIG. These computer program instructions can be provided to a processor of a general purpose computer, a special purpose computer, an embedded processor, or other programmable data processing device to produce a machine for generating instructions for execution by a processor of a computer or other programmable data processing device. Means for implementing the functions specified in one or more flows of the flowchart or in a block or blocks of the flowchart.

The computer program instructions can also be stored in a computer readable memory that can direct a computer or other programmable data processing device to operate in a particular manner, such that the instructions stored in the computer readable memory produce an article of manufacture comprising the instruction device. The apparatus implements the functions specified in one or more blocks of a flow or a flow and/or block diagram of the flowchart.

These computer program instructions can also be loaded onto a computer or other programmable data processing device such that a series of operational steps are performed on a computer or other programmable device to produce computer-implemented processing for execution on a computer or other programmable device. The instructions provide steps for implementing the functions specified in a block or blocks of a flow or a flow and/or a block diagram of a flowchart.

The above are merely some embodiments of the present disclosure. A person skilled in the art may make further modifications and improvements without departing from the principle/spirit of the present disclosure, and these modifications and improvements shall also fall within the scope of the present disclosure.

A1. A method for sharing a user equipment (UE) context, applied to a second mobility management unit (MME) and including:

acquiring a global unique temporary identity (GUTI) of the UE in a network to which the UE is registered;

in the case that a public land mobile network identity (PLMN-ID) in the GUTI is a neutral host access indicator (NHAMI) representing a unique network identity shared by a global Multefire neutral host (NH) network, determining that the network to which the UE is registered is a NH network, and acquiring a NH network identity (NHN-ID) of the NH network to which the UE is registered; and acquiring, based on the NHN-ID and the GUTI, context information of the UE in the network to which the UE is registered.

A2. The method according to claim A1, further including:

in the case that the PLMN-ID in the GUTI is not the NHAMI representing the unique network identity shared by the global Multefire NH network, determining that the network to which the UE is registered is a 3GPP network, and acquiring, based on the GUTI, the context information of the UE in the network to which the UE is registered.

A3. The method according to claim A1, where the acquiring the GUTI of the UE in the network to which the UE is registered includes:

acquiring a non-access stratum (NAS) request message sent by the UE and carrying at least the GUTI of the UE in the network to which the UE is registered, where the request message is a tracking area update (TAU) request message, a service request (SR) message, or an attach request message.

A4. The method according to claim A3, where the acquiring the NHN-ID of the NH network to which the UE is registered includes:

acquiring from the request message the NHN-ID of the NH network to which the UE is registered, in the case that the request message carries the NHN-ID of the NH network to which the UE is registered.

A5. The method according to claim A3, where the acquiring the NHN-ID of the NH network to which the UE is registered includes:

acquiring via a S1 interface the NHN-ID of the NH network to which the UE is registered, or determining that the NHN-ID of the NH network to which the UE is registered is the NHN-ID supported by the second MME, in the case that the request message does not carry the NHN-ID of the NH network to which the UE is registered.

A6. The method according to claim A1, where the acquiring, based on the NHN-ID and the GUTI, the context information of the UE in the network to which the UE is registered includes:

determining, based on an MME identity in the GUTI and the NHN-ID, a first MME for the UE in the network to which the UE is registered;

sending a UE context request message carrying the MME identity and the NHN-ID to the first MME; and receiving the context information of the UE sent by the first MME, where the context information of the UE includes a Participating Service Provider Identity (PSP-ID) authenticated by the UE, the NHN-ID and security context information of the UE.

B7. A device for sharing a user equipment (UE) context, applied to a second mobility management unit (MME) and including:

a first acquiring module, configured to acquire a global unique temporary identity (GUTI) of the UE in a network to which the UE is registered;

a second acquiring module, configured to, in the case that a public land mobile network identity (PLMN-ID) in the GUTI is a neutral host access indicator (NHAMI) representing a unique network identity shared by a global Multefire neutral host (NH) network, determine that the network to which the UE is registered is a NH network, and acquire a NH network identity (NHN-ID) of the NH network to which the UE is registered; and a third acquiring module, configured to acquire, based on the NHN-ID and the GUTI, context information of the UE in the network to which the UE is registered.

B8. The device according to claim B7, further including:

a fourth acquiring module, configured to, in the case that the PLMN-ID in the GUTI is not the NHAMI representing the unique network identity shared by the global Multefire NH network, determine that the network to which the UE is registered is a 3GPP network, and acquire, based on the GUTI, the context information of the UE in the network to which the UE is registered.

B9. The device according to claim B7, where the first acquiring module includes:

an acquiring unit, configured to acquire a non-access stratum (NAS) request message sent by the UE and carrying at least the GUTI of the UE in the network to which the UE is registered, where the request message is a tracking area update (TAU) request message, a service request (SR) message, or an attach request message.

B10. The device according to claim B9, where the second acquiring module is further configured to acquire from the request message the NHN-ID of the NH network to which the UE is registered, in the case that the request message carries the NHN-ID of the NH network to which the UE is registered.

B11. The device according to claim B9, where the second acquiring module is further configured to acquire via a S1 interface the NHN-ID of the NH network to which the UE is registered, or determine that the NHN-ID of the NH network to which the UE is registered is the NHN-ID supported by the second MME, in the case that the request message does not carry the NHN-ID of the NH network to which the UE is registered.

B12. The device according to claim B7, where the third acquiring module includes:

a determining module, configured to determine, based on an MME identity in the GUTI and the NHN-ID, a first MME for the UE in the network to which the UE is registered;

a sending module, configured to send a UE context request message carrying the MME identity and the NHN-ID to the first MME; and a receiving module, configured to receive the context information of the UE sent by the first MME, where the context information of the UE includes a Participating Service Provider Identity (PSP-ID) authenticated by the UE, the NHN-ID and security context information of the UE.

C13. A method for sharing a user equipment (UE) context, applied to a first mobility management unit (MME) and including:

receiving a user equipment (UE) context request message sent by a second MME and carrying a global unique temporary identity (GUTI) of a UE in a network to which the UE is registered and a neutral host network identity (NHN-ID);

sending, based on the UE context request message, context information of the UE to the second MME.

D14. A device for sharing a user equipment (UE) context, applied to a first mobility management unit (MME) and including:

a receiving module, configured to receive a user equipment (UE) context request message sent by a second MME and carrying a global unique temporary identity (GUTI) of a UE in a network to which the UE is registered and a neutral host network identity (NHN-ID);

a sending module, configured to send, based on the UE context request message, context information of the UE to the second MME.

E15. A method for sharing a user equipment (UE) context, applied to a UE and including:

in the case that a registered network is a Multefire neutral host (NH) network, sending a global unique temporary identity (GUTI) of the registered network and a NH network identity (NHN-ID) of the registered network to a second mobility management unit (MME), to enable the second MME to acquire context information of the UE based on the GUTI and the NHN-ID, where a public land mobile network identity (PLMN-ID) in the GUTI is a neutral host access indicator (NHAMI) representing a unique network identity shared by a global Multefire NH network.

E16. The method according to claim E15, further including:

in the case that the registered network is not the Multefire NH network, sending the GUTI of the registered network to the second MME, to enable the second MME to acquire the context information of the UE based on the GUTI, where the PLMN-ID in the GUTI is the PLMN-ID of the registered network.

E17. The method according to claim E15, where the sending the GUTI of the registered network and the NHN-ID of the registered network to the second MME includes:

sending, through a non-access stratum (NAS) request message, the GUTI of the registered network and the NHN-ID of the registered network to the second MME, where the request message is a tracking area update (TAU) request message, a service request (SR) message, or an attach request message.

E18. The method according to claim E15, where the sending the GUTI of the registered network and the NHN-ID of the registered network to the second MME includes:

determining whether a currently selected NH network is the registered NH network;

sending the GUTI of the registered network to the second MME in the case that the currently selected NH network is the registered NH network, or sending the GUTI of the registered network and the NHN-ID of the registered network to the second MME in the case that the currently selected NH network is not the registered NH network.

F19. A chip for sharing a user equipment (UE) context, applied to a second mobility management unit (MME) and including a processor and a memory storing a program to be executed by the processor, when the program is executed, the processor is configured to:

acquire a global unique temporary identity (GUTI) of the UE in a network to which the UE is registered;

in the case that a public land mobile network identity (PLMN-ID) in the GUTI is a neutral host access indicator (NHAMI) representing a unique network identity shared by a global Multefire neutral host (NH) network, determine that the network to which the UE is registered is a NH network, and acquire a NH network identity (NHN-ID) of the NH network to which the UE is registered; and acquire, based on the NHN-ID and the GUTI, context information of the UE in the network to which the UE is registered.

G20. A chip for sharing a user equipment (UE) context, applied to a first mobility management unit (MME) and including a processor and a memory storing a program to be executed by the processor, when the program is executed, the processor is configured to:

receive a user equipment (UE) context request message sent by a second MME and carrying a global unique temporary identity (GUTI) of a UE in a network to which the UE is registered and a neutral host network identity (NHN-ID);

send, based on the UE context request message, context information of the UE to the second MME.

What is claimed is:

1. A method for sharing a user equipment (UE) context, applied to a second mobility management unit (MME) and comprising:

acquiring a global unique temporary identity (GUTI) of the UE in a network to which the UE is registered;

in the case that a public land mobile network identity (PLMN-ID) in the GUTI is a neutral host access indicator (NHAMI) representing a unique network identity shared by a global Multefire neutral host (NH) network, determining that the network to which the UE is registered is an NH network, and acquiring an NH network identity (NHN-ID) of the NH network to which the UE is registered; and acquiring, based on the NHN-ID and the GUTI, context information of the UE in the network to which the UE is registered.

2. The method according to claim 1, further comprising: in the case that the PLMN-ID in the GUTI is not the NHAMI representing the unique network identity shared by the global Multefire NH network, determining that the network to which the UE is registered is a 3GPP network, and acquiring, based on the GUTI, the context information of the UE in the network to which the UE is registered.

3. The method according to claim 1, wherein the acquiring the GUTI of the UE in the network to which the UE is registered comprises:

acquiring a non-access stratum (NAS) request message sent by the UE and carrying at least the GUTI of the UE in the network to which the UE is registered, wherein the request message is a tracking area update (TAU) request message, a service request (SR) message, or an attach request message.

4. The method according to claim 3, wherein the acquiring the NHN-ID of the NH network to which the UE is registered comprises:

acquiring from the request message the NEIN-ID of the NH network to which the UE is registered, in the case that the request message carries the NHN-ID of the NH network to which the UE is registered.

5. The method according to claim 3, wherein the acquiring the NHN-ID of the NH network to which the UE is registered comprises:

acquiring via a S1 interface the NHN-ID of the NH network to which the UE is registered, or determining that the NHN-ID of the NH network to which the UE is registered is the NHN-ID supported by the second MME, in the case that the request message does not carry the NHN-ID of the NH network to which the UE is registered.

6. The method according to claim 1, wherein the acquiring, based on the NHN-ID and the GUTI, the context information of the UE in the network to which the UE is registered comprises:

determining, based on an MME identity in the GUTI and the NHN-ID, a first MME for the UE in the network to which the UE is registered;

sending a UE context request message carrying the MME identity and the NHN-ID to the first MME; and receiving the context information of the UE sent by the first MME, wherein the context information of the UE comprises a Participating Service Provider Identity (PSP-ID) authenticated by the UE, the NHN-ID and security context information of the UE.

7. A device for sharing a user equipment (UE) context, applied to a second mobility management unit (MME) and comprising a processor and a memory, wherein the processor is configured to read a program in the memory to:

a acquire a global unique temporary identity (GUTI) of the UE in a network to which the UE is registered;

a in the case that a public land mobile network identity (PLMN-ID) in the GUTI is a neutral host access indicator (NHAMI) representing a unique network identity shared by a global Multefire neutral host (NH) network, determine that the network to which the UE is registered is an NH network, and acquire an NH network identity (NHN-ID) of the NH network to which the UE is registered; and a acquire, based on the NHN-ID and the GUTI, context information of the UE in the network to which the UE is registered.

8. The device according to claim 7, wherein the processor is further configured to read a program in the memory to:

a in the case that the PLMN-ID in the GUTI is not the NHAMI representing the unique network identity shared by the global Multefire NH network, determine that the network to which the UE is registered is a 3GPP network, and acquire, based on the GUTI, the context information of the UE in the network to which the UE is registered.

9. The device according to claim 7, wherein the processor is further configured to read a program in the memory to:

a acquire a non-access stratum (NAS) request message sent by the UE and carrying at least the GUTI of the UE in the network to which the UE is registered, wherein the request message is a tracking area update (TAU) request message, a service request (SR) message, or an attach request message.

10. The device according to claim 9, wherein the processor is further configured to read a program in the memory to: acquire from the request message the NHN-ID of the NH network to which the UE is registered, in the case that the request message carries the NHN-ID of the NH network to which the UE is registered.

11. The device according to claim 9, wherein the processor is further configured to read a program in the memory to: acquire via a S1 interface the NHN-ID of the NH network to which the UE is registered, or determine that the NHN-ID of the NH network to which the UE is registered is the NHN-ID supported by the second MME, in the case that the request message does not carry the NHN-ID of the NH network to which the UE is registered.

12. The device according to claim 7, wherein the processor is further configured to read a program in the memory to:

a determine, based on an MME identity in the GUTI and the NHN-ID, a first MME for the UE in the network to which the UE is registered;

a send a UE context request message carrying the MME identity and the NHN-ID to the first MME; and a receive the context information of the UE sent by the first MME, wherein the context information of the UE comprises a Participating Service Provider Identity (PSP-ID) authenticated by the UE, the NHN-ID and security context information of the UE.

13. A method for sharing a user equipment (UE) context, applied to a UE and comprising:

in the case that a registered network is a Multefire neutral host (NH) network, sending a global unique temporary identity (GUTI) of the registered network and an NH network identity (NHN-ID) of the registered network to a second mobility management unit (MME), to enable the second MME to acquire context information of the UE based on the GUTI and the NHN-ID, wherein a public land mobile network identity (PLMN-ID) in the GUTI is a neutral host access indicator (NHAMI) representing a unique network identity shared by a global Multefire NH network.

14. The method according to claim 13, further comprising:

in the case that the registered network is not the Multefire NH network, sending the GUTI of the registered network to the second MME, to enable the second MME to acquire the context information of the UE based on the GUTI, wherein the PLMN-ID in the GUTI is the PLMN-ID of the registered network.

15. The method according to claim 13, wherein the sending the GUTI of the registered network and the NHN-ID of the registered network to the second MME comprises:
sending, through a non-access stratum (NAS) request message, the GUTI of the registered network and the NHN-ID of the registered network to the second MME, wherein the request message is a tracking area update (TAU) request message, a service request (SR) message, or an attach request message.

16. The method according to claim 13, wherein the sending the GUTI of the registered network and the NHN-ID of the registered network to the second MME comprises:
determining whether a currently selected NH network is the registered NH network;
sending the GUTI of the registered network to the second MME in the case that the currently selected NH network is the registered NH network, or sending the GUTI of the registered network and the NHN-ID of the registered network to the second MME in the case that the currently selected NH network is not the registered NH network.

* * * * *